(12) United States Patent
Bakir

(10) Patent No.: US 8,554,834 B2
(45) Date of Patent: Oct. 8, 2013

(54) SHORT MESSAGE ALERT (SMA)

(75) Inventor: Yusuf Huzefa Bakir, Maharastra (IN)

(73) Assignee: Accenture Global Services Limited, Dublin (IE)

( * ) Notice: Subject to any disclaimer, the term of this patent is extended or adjusted under 35 U.S.C. 154(b) by 258 days.

(21) Appl. No.: 13/128,622

(22) PCT Filed: Nov. 12, 2008

(86) PCT No.: PCT/EP2008/009553
§ 371 (c)(1),
(2), (4) Date: Jul. 26, 2011

(87) PCT Pub. No.: WO2010/054672
PCT Pub. Date: May 20, 2010

(65) Prior Publication Data
US 2011/0295963 A1   Dec. 1, 2011

(51) Int. Cl.
*G06F 15/16* (2006.01)
*G06F 12/00* (2006.01)

(52) U.S. Cl.
USPC .......................................... 709/203; 709/250

(58) Field of Classification Search
USPC .................. 790/203, 217–218, 225–229, 250
See application file for complete search history.

(56) References Cited

U.S. PATENT DOCUMENTS

| | | | | |
|---|---|---|---|---|
| 2008/0183594 A1* | 7/2008 | Wachi | .............................. | 705/26 |
| 2010/0005398 A1* | 1/2010 | Pratley et al. | .................. | 715/751 |
| 2010/0185852 A1* | 7/2010 | Ogawa et al. | .................. | 713/165 |
| 2011/0185006 A1* | 7/2011 | Raghav et al. | ................. | 709/201 |
| 2012/0284641 A1* | 11/2012 | Sitrick et al. | ................... | 715/753 |
| 2013/0013988 A1* | 1/2013 | Yamamoto | ..................... | 715/201 |

OTHER PUBLICATIONS

International Preliminary Report on Patentability from corresponding International Application No. PCT/EP2008/009553, 11pp., dated Feb. 15, 2011.
Written Opinion and International Search Report from corresponding International Application No. PCT/EP2008/009553, 14pp., dated Aug. 25, 2009.
Rosenberg et al., An Overview of the Andrew Message System, A Portable, Distributed System of Multi-media Electronic Communication, Computer Communication Review (ACM Press); Proceedings of the ACM SIGOMM 1987 Workshop, Aug. 11-13, 1987, No. 5, Special Issue, pp. 99-108.
Libes, Tcl/Tk-based Agents for Mail and News Notification, Software Practice and Experience, vol. 27(4), pp. 481-493, Apr. 1997.
European Search Report for Application No. 08875016.1-1238 dated Aug. 27, 2012.

(Continued)

*Primary Examiner* — Zarni Maung
(74) *Attorney, Agent, or Firm* — Brinks Hofer Gilson & Lione

(57) ABSTRACT

The present description refers in particular, to a method, a system, and a computer program product for processing messages in an Outsourcing (BPO) Environment. The method may comprise installing and executing one or more computer programs. The method may also comprise obtaining messages from a shared folder using a network interface. The method may further comprise displaying messages using a display interface. In addition, the method may comprise providing access control, including controlling access to messages and dissemination of messages. The BPO environment may comprise at least one user computer. The network interface and the display interface may be executed separately on the user computer.

21 Claims, 9 Drawing Sheets

(56) References Cited

OTHER PUBLICATIONS

DropboxMQ Latest News: 0.8—The devil is in the details, Sep. 2, 2008, retrieved from the Internet: http://web.archive.org/web/20081003033754/http://dropboxmq.sourceforge.net (retrieved on Aug. 15, 2012).

Eric Moreau, Running Assemblies From a Shared Folder, Apr. 2004, retrieved from the Internet: http://www.universalthread.com/viewpagearticle.aspx?ID=301 (retrieved on Sep. 6, 2012).

* cited by examiner

SHORT MESSAGE ALERT (SMA)

TECHNICAL FIELD

The following description relates to computer-implemented messaging in an Outsourcing environment.

BACKGROUND

Globalization and the proliferation of information technology enables tasks that were once performed locally within an organization to be performed in other locations and possibly by other organizations. It is often desirable for an organization to have tasks performed in an area where labor is more cost-effective and/or to take advantage of the expertise and/or specialization of another organization. It may also be useful for an organization to focus on its core business and push tasks unrelated to its core business to other organizations.

Outsourcing and, particularly, Business Process Outsourcing (BPO) may be understood to describe a situation where a client organization imposes a specific set of tasks upon a third party. The third party may be a separate or an auxiliary organization. The third party may be located in another country or in a location near the client organization. One example of Business Process Outsourcing is a third party organization providing information technology (IT) services for an automobile and/or a machine tools manufacturer. These IT services might range from supply chain management to the control of manufacturing processes. Some of these IT services might be performed in one country whereas other IT services may be performed in a different country.

An outsourcing environment, particularly a BPO environment may be understood to include objects, processes and circumstances defining how the third party performs tasks for the client organization. The elaboration of a BPO environment may include information system configuration requirements, access control requirements or restrictions imposed for the sake of security. The objects in the BPO environment may include equipment, such as computers with a specific configuration. It may be desirable for a client organization to partially define a BPO environment for the third party in order to mitigate risk and maintain accountability within the client organization. Thus, the third party may be required to operate under restrictions outside its control.

One or more technical restrictions may be imposed on users, user computers and/or server computers in a BPO environment. It may be desirable to constrain the communications of computers in a BPO environment to one Local Area Network (LAN), or to limit the communications of a computer in a BPO environment to an explicitly identified set of computers. Network connectivity in a BPO environment may be limited to users and computers directed to perform a specific set of tasks. It may also be desirable to restrict user access to computers and/or to restrict the interactions allowed between computers.

Prior art messaging solutions may require open TCP/IP ports or the enabling of insecure services on user computers. Other prior art messaging solutions may require software to be installed on each user computer. Prior art solutions may also require system registry changes to be performed on a user computer. Prior art solutions may further require access to the Internet or to other computers outside the third party's network perimeter. These and other requirements may not be possible or desirable for messaging in a BPO environment.

SUMMARY

Thus, it is an object of the invention to allow the processing of messages in a BPO environment despite technical restrictions present within the BPO environment. This problem is solved according to the independent claims. Preferred embodiments are defined in the dependent claims.

According to an aspect, a method is provided for processing messages in a an outsourcing (BPO) environment (particularly a Business Process Outsourcing (BPO) environment). The method comprises installing and executing one or more computer programs; obtaining messages from a shared folder using a network interface; displaying messages, using a Display Interface; and providing access control, including, controlling access to messages and dissemination of messages. In addition, the BPO environment comprises at least one user computer. Furthermore, the network interface and the Display Interface are executed separately on the user computer.

Accordingly, it may be the case that the user computer accepts network communications received as a response to a request originating from the user computer and the user computer does not accept network communications which originate from another computer. For example, this may be understood to mean that the user computer will accept Transmission Control Protocol (TCP) or User Datagram Protocol (UDP) packets from another computer only if those packets are determined to be a response to TCP or UDP packets sent by the user computer.

It may also be the case that the BPO environment comprises a server computer. In this case, the shared folder is stored on the server computer, the shared folder contains the one or more computer programs, and the shared folder is accessible by the user computer.

Furthermore, it may be that the one or more computer programs in the shared folder are executed from the user computer in order to run the Display Interface and the network interface on the user computer.

Moreover, it may be the case that installing and executing the one or more computer programs operates without administrator access. This may be understood to mean that installing and executing the one or more computer programs does not require administrator access to the user computer and/or the server computer.

In addition, it may be that, in the BPO environment, a computer program may only be installed on the user computer if the installation of the computer program works without changes to the registry of the user computer.

It may also be the case that, the network interface and the Display Interface are executed as separate processes or threads on the user computer. In other words, the network interface may be executed as one process and the Display Interface is executed as another process. Alternatively, the network interface and the Display Interface may both be executed as threads within the same process. Other combinations are also possible as long as the network interface and the Display Interface are scheduled for execution separately (i.e. independently) on one or more CPUs.

Accordingly, providing access control may further include controlling which users are able to receive messages. Providing access control may also include controlling which users are able to send messages.

It may also be the case that users are hindered from preventing the dissemination of messages. Additionally, it may be that generating and disseminating messages in a BPO environment is performed without installing any files on the user computer.

According to another aspect, any one of the methods described above may be implemented as a computer program product comprising computer-readable instructions, which, when loaded and executed on a computer system, cause the computer system to perform operations according to the method. The product may be stored on a computer-readable medium or the product may be received as a signal or the product may be downloaded.

According to yet another aspect, a system is provided for generating and disseminating messages in a Outsourcing (BPO) environment, particularly in a Business Process Outsourcing (BPO) environment, comprises: a network interface for obtaining messages from a shared folder; a Display Interface for displaying messages; and a means for providing access control, including, controlling access to messages, and dissemination of messages. In addition, the BPO environment comprises at least one user computer and at least one server computer. Furthermore, the network interface and the Display Interface are executed separately on the user computer.

These and other aspects may be implemented using a Short Message Alert (SMA) software Package (also referred to as "SMA Package"). The SMA Package comprises an SMA Ticker and an SMA Console.

These and other aspects may have a number of advantages. One advantage may be that the SMA Package requires minimal installation. Put another way, the SMA Package is easy to install. In the context of a Microsoft Windows environment, installation of the SMA Package does not require registry changes or administrator access to the user computer. It is also possible to use the SMA Package without copying any files to the user computer. In addition, the SMA Package does not require a dedicated server.

A further advantage may be that the SMA Package can operate under technical restrictions and/or requirements of a BPO environment. For example, the SMA Package does not require open TCP/IP ports on user computers in order to allow messages to be delivered. Opening a TCP/IP port on a computer may be understood as allowing an additional application to initiate communication to the computer. Instead of requiring messages to be sent to the user computer, the SMA Package may be configured to pull messages from a server.

An additional advantage of the SMA Package may be that the SMA Package works without access to the Internet in order to function. Thus, the integrity of an organization's network perimeter may be preserved. It may be an advantage to be able to send messages under these circumstances.

A further advantage of the SMA Package may be that users are hindered from shutting down the SMA Ticker. This helps ensure that a message reaches as many of its intended recipients as possible. In addition, messages sent using the SMA Package may be encrypted.

Another advantage of the SMA Package may be that it is possible to control which users can send messages. Thus, the SMA Package provides multiple levels of access; via the SMA Console it is possible to configure the users that can view messages and the users that can send messages. The ability to configure which users can send messages may be a restriction placed on a third party by a client organization in a BPO environment.

In addition, the SMA Console may be configured to maintain a log of the alerts that it has been used to send. This may be useful for security purposes or to provide a historical perspective.

Another advantage of the SMA Package may be the splitting of the SMA Ticker (i.e. the Server Interface and the Ticker Interface) during execution on the user computer. This separation of the SMA Ticker reduces the effect of network congestion since the retrieval of messages is handled separately from the display of messages.

In the text that follows, the terms process and service are used interchangeably to describe a computer program in execution. As used in this document, a process or service has a program, an input, an output and a state. In addition, the term network interface may be used to describe a Server Interface and the term Display Interface may be used to describe a Ticker Interface.

Administrator access may be understood as superuser or privileged access to a computer system. In the context of a specific operating system, administrator access may be understood as access to the Administrator account in a Microsoft® Windows® environment, as membership of the Administrators group in a Microsoft Windows environment or as access to the root account in a Unix environment. In this document, Microsoft Windows is used to refer to a recent version of Microsoft's Windows operating system, such as Microsoft Windows 2000 or Microsoft Windows XP (Microsoft, Windows, Windows XP and EXCEL are trademarks of Microsoft Corporation).

A registry or a computer's registry may be understood as a central database containing information for booting, configuring and tailoring a computer system. A registry may be associated with recent versions of Microsoft's Windows operating system.

Details of one or more implementations are set forth in the accompanying exemplary description and drawings below. Other features will be apparent from the description and drawings, as well as from the claims.

DETAILED DESCRIPTION

In the following text, a detailed description of examples will be given with reference to the drawings. It should be understood that various modifications to the examples may be made. In particular, elements of one example may be combined and used in other examples to form new examples.

Figure 1:
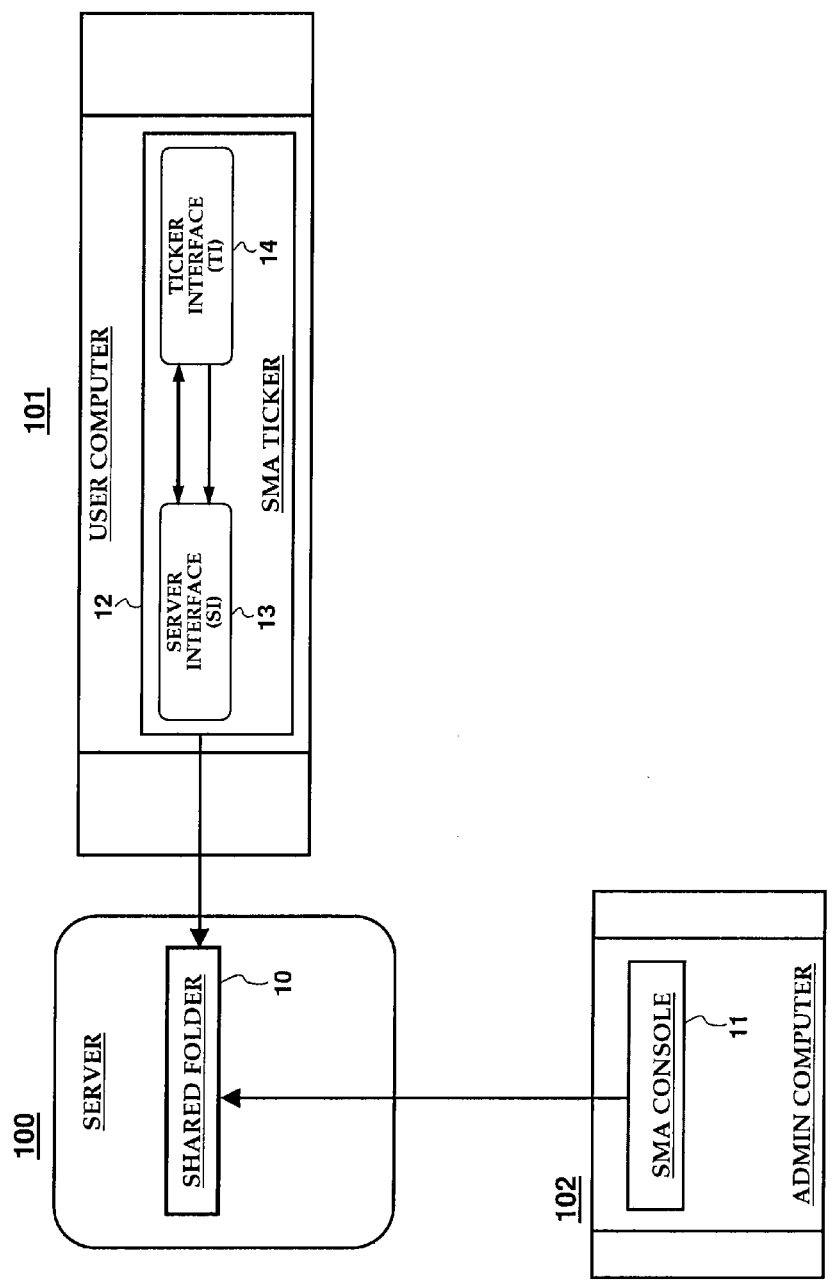
FIG. 1 is a block diagram of a server, a user computer and an administrator (admin) computer.

FIG. 1 conceptually illustrates a server 100, a user computer 101, and an administrator (admin) computer 102 in an Outsourcing environment, particularly in a Business Process Outsourcing (BPO) environment.

The BPO environment in which the server 100, the user computer 101 and the admin computer 102 reside may consist of one or more computers connected by a network. The server 100, the user computer 101 and the admin computer 102 may be connected to the same Local Area Network (LAN) or may each be part of different LANs connected together via a Wide Area Network (WAN) or the Internet. Similarly, the BPO environment may be confined to one physical location or spread out over multiple physical locations. If the server 100, the user computer 101, and/or the admin computer 102 are not located spatially near each other (i.e. not part of the same LAN), they may be connected using Virtual Private Network(s) (VPN) or via another type of protected network in order to provide secure communications. A VPN may be understood as a network where packets that are internal to a private network pass across a public network (e.g. the Internet) without this being obvious to hosts on the private network. Encryption is generally used on VPN in order to provide security.

A specific BPO environment that spans multiple physical locations may have the benefit of allowing a client organization to control message distribution to a third party. In one example, this might be advantageous in a situation where machines are located at the site of the client organization and managed from the location of the third party. The client organization may then be able to send messages to the third party regarding changes to the status of the machines.

A specific BPO environment spatially confined to one location (or multiple locations that are spatially near each other) may have the benefit of being more secure. For example, the client organization may wish to control the operational environment of the third party and may wish the network of the third party to be a self-contained unit. This may be advisable if it is not necessary for the computers of the client organization and the third party to communicate with each other via a computer network.

The server 100, may be a file server with a shared folder 10 accessible by at least one user computer 101. Although one server 100 and one user computer 101 are depicted, a BPO environment may comprise multiple user computers and/or multiple servers. Similarly, each server may contain multiple shared folders. The shared folder 10 may contain one or more files that may be executed from the user computer 101 in order to run a Server Interface 13, and/or a Ticker Interface 14 on the user computer 101. The shared folder 10 may also contain one or more files that may be executed from the admin computer 102 in order to run a Short Message Alert (SMA) Console 11 on the admin computer 102. The files required to run the Service Interface 13, the Ticker Interface 14, and/or the SMA Console 11 may also be stored in multiple shared folders which may be located on one server computer or on multiple server computers. The shared folder 10 may contain a file that may be executed in order to run the SMA Console 11 (i.e. the SMA Console executable), and/or a file that may be executed in order to run an SMA Ticker 12 (i.e. the SMA Ticker executable file). Items or files in the shared folder 10 may be shared using a file sharing protocol supported in a Microsoft Windows environment (e.g. Common Internet File System and/or Server Message Block). The files for running the SMA Console 11 and the SMA Ticker 12 (including the Ticker Interface and the Server Interface), and sending messages to one or more users in a BPO environment, may be referred to as the SMA Package. Locating the files in the shared folder 10 on the server 100 and executing them from the user computer 101 in the way described above may provide the following advantages. It may allow the installing and/or the executing of the SMA Console 11 and the SMA Ticker 12 without storing any executable files on the user computer 101 or the admin computer 102. It may be possible to install and/or execute the SMA Console 11 and/or the SMA Ticker 12 without storing any files on the user computer 101 or the admin computer 102. Furthermore, it may be possible to install the SMA Console 11 and/or the SMA Ticker 12 without making any changes to the registry of the user computer 101 or the admin computer 102. In addition, it may be possible to execute the SMA Console 11 and/or the SMA Ticker 12 with no or minimal changes to the registry of the user computer 101 or the admin computer 102. These advantages may be desirable due to the technical restrictions required for operations in the BPO environment.

One or more of the following technical restrictions may be desirable for user computers and/or server computers in a BPO environment. It may be desirable to restrict or prevent changes to the computer's registry. It may also be desirable not to grant administrator access to users and/or system administrators working where the user computer 101, the server 100, and/or the admin computer 102, are physically located. In addition, it may be desirable to restrict the access to the Internet and/or to restrict access to computers outside the organization. Furthermore, it may be desirable to restrict network communications to the or a specific user computer such that the user computer accepts network communications received as a response to a request originating from the user computer, and that the user computer does not accept network communications which originate from another computer. Moreover, it may be desirable that only selected users are allowed to send messages. Additionally, it may be desirable to prevent messages from being sent directly to user computers. It may also be desirable to block or hinder users from shutting down programs on user computers. Furthermore, it may be desirable to prevent messages from being sent without a log of the message being recorded. It may also be desirable to prevent the emission of a sound from a computer at the arrival of an email message. It may be desirable to disable specific services, e.g. Microsoft Windows Messaging.

One or more of the following technical restrictions may be desirable with regard to installing computer programs on the user computer and/or on a server computer in a BPO environment. It may be desirable to restrict or prevent changes to a computer's registry during computer program installation. It may also be desirable to install and/or execute computer programs without administrator access. Furthermore, it may be desirable to install and/or execute computer programs without opening any TCP/IP ports. Moreover, it may be desirable to install and/or execute computer programs without storing any files on the user computer.

Technical restrictions in a BPO environment may be imposed to prevent misuse of equipment belonging to the client organization, promote user productivity, and/or to provide a secure computing environment.

Within the restrictions of a BPO environment, it may be desirable to send messages to multiple user computers. Messages may be useful to provide specific information/reminders or to encourage users to achieve a performance target. In addition, messages may be useful to alter user behavior or to convey information more quickly and/or efficiently than other methods. It may be useful to reach multiple users quickly or to provide multiple users with specific information. For example, if the method for operating a device changes on short notice, it may be important to inform users of the changes as quickly as possible so as to prevent injuries or damage to the device.

An advantage of the SMA Package may be that installation of the SMA Package requires minimal resources and minimal access to those resources. The available resources may be the user computer 101, the server computer 100, the shared folder 10, and computer network infrastructure (e.g. a LAN) to connect the user computer 101 and the server computer 100.

These resources may already be in place in a BPO environment. The access rights required may be the access rights needed to store files in the shared folder 10 and execute the stored files from the user computer 101. The requirement for minimal access rights may provide improved security.

The user computer 101 comprises the SMA Ticker 12. The SMA Ticker includes a Server Interface 13, and the Ticker Interface 14. The Server Interface 13 and the Ticker Interface 14 are executed separately on the user computer. In this case separate execution may be understood to mean that the Server Interface 13 and the Ticker Interface 14 are controlled and/or scheduled for execution independently. Thus, the Server Interface 13 and the Ticker Interface 14 may be executed as separate processes (i.e. each with a separate address space) or as separate threads (i.e. separate threads of control sharing the same address space and all of its data). An advantage of the separation of the Server Interface 13 and the Ticker Interface 14 is that network congestion or an inability to retrieve messages from the shared folder 10 has minimal effect on the user computer 101. This is achieved by handling message retrieval and display functions independently.

The Server Interface 13 may perform the task of retrieving messages from the shared folder 10 on the server 100. Thus, the Server Interface 13 may interact with the server 100 via a network. Since the Server Interface 13 retrieves messages from the server 100, it is unnecessary for the user computer 101 to accept network communications initiated by other computers (e.g. a TCP packet or an attempt to initiate a TCP connection). It may be desirable to restrict network communications between user computers in a BPO environment. The Server Interface 13 may be executed as a service on the user computer 101 and may run in the background, unnoticed by the user.

By periodically or constantly monitoring the status of the Ticker Interface 14, the Server Interface 13 may ensure that the Ticker Interface 14 is still running. This may prevent or hinder users from accidentally or intentionally shutting down the Ticker Interface 14. This may have the advantage of ensuring that as many users as possible receive the messages that are intended for them.

Figure 2:
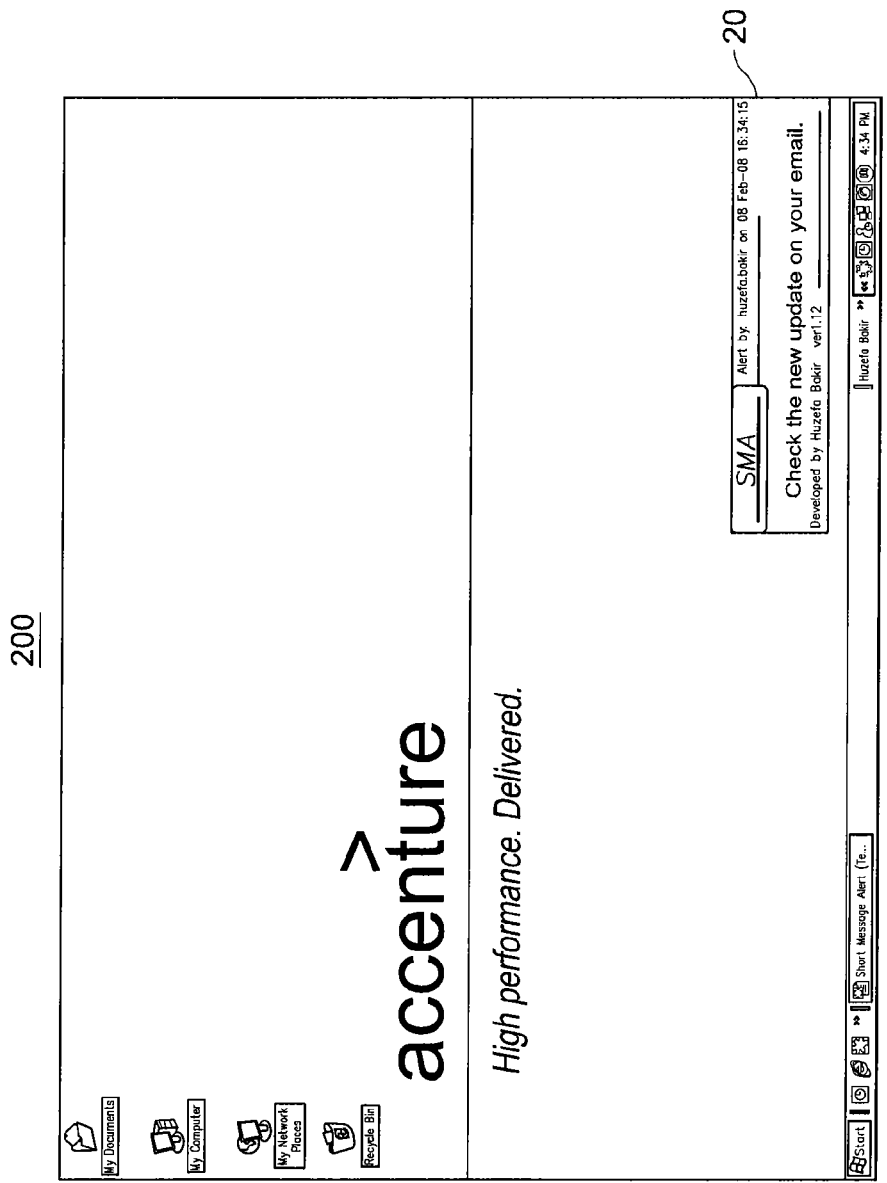
FIG. 2 shows a display on a user computer with an SMA Ticker window in the bottom right corner.
Figure 6:
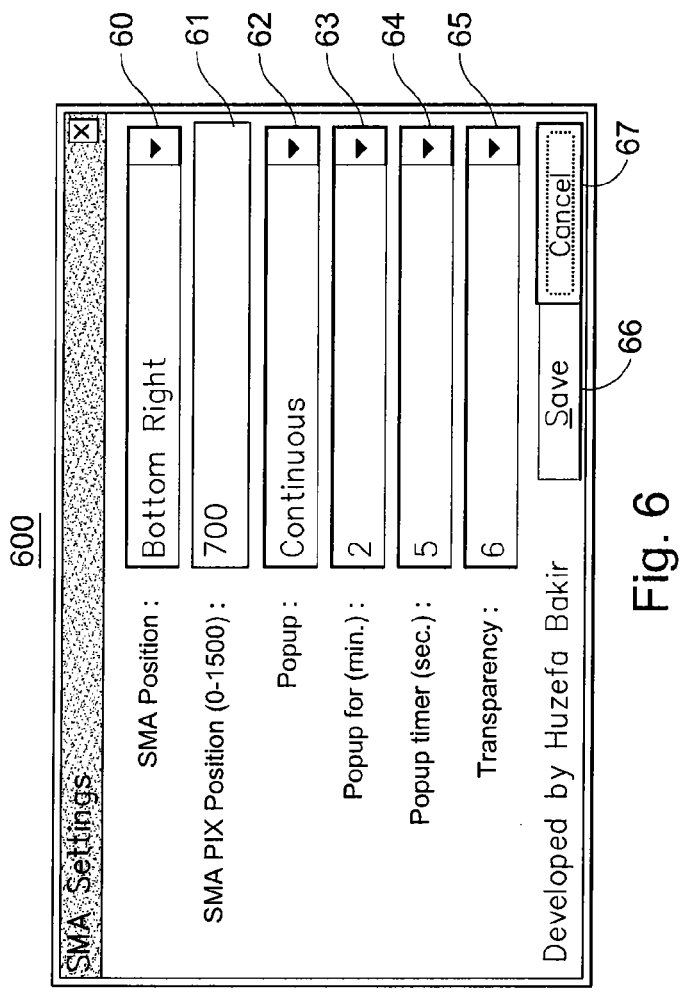
FIG. 6 shows an exemplary SMA Settings screen, accessed via the SMA Console.

The Ticker Interface 14 may communicate with the Server Interface 13 in order to obtain new messages and/or new settings information (new settings information may be added using an SMA settings screen 600 as shown in FIG. 6). Thus, the Ticker Interface 14 interacts with the Server Interface 13 and the display on the user computer 101 in order to provide the user with messages. The appearance of the SMA Ticker window 20, as indicated in FIG. 2, on the display of the user computer 101 is highly configurable and may be tailored to maximize the efficiency of the user. The Ticker Interface 14 may monitor the Server Interface 13 periodically to ensure that the Server Interface 13 is still running and/or to ensure that the Service Interface 13 has not been accidentally or purposely shut off by the user.

The SMA Ticker executable may be executed in order to run the Server Interface 13 and the Ticker Interface 14 on the user computer 101.

The uni-directional arrow from the SMA Ticker 12 to the shared folder 10 on the server 100 indicates that the Server Interface 13 of the SMA Ticker 12 periodically probes the shared folder 10 to search for new messages and/or settings modifications, e.g. modifications made using SMA settings screen 600. In other words, the Server Interface 13 queries the server 100 to determine if there are any new messages and/or settings modifications stored in the shared folder 10. A query from the Server Interface 13 to the server 100 may be performed by checking the date and time of a file, e.g. by checking the timestamp indicating when the file was last modified, on the server 100. If the Server Interface 13 discovers new messages in the shared folder 10, the new messages are copied to the user computer 101. For example, the Server Interface 13 may compare the date and time a file in the shared folder 10 was last modified with the date and time of the most recent prior query. According to this example, the file will be opened only if the date and time the file was last modified is more current than (i.e. subsequent to) the date and time of the most recent prior query. Configuring the Server Interface 13 to open files in the shared folder 10 only when changes to the files have been made may have the advantages of reducing network congestion, allowing messages to be retrieved more frequently, reducing the possibility of file sharing conflicts (e.g. when multiple processes attempt to read and write to the same file concurrently), and may lead to more efficient message processing.

The uni-directional arrow from the Ticker Interface 14 to the Server Interface 13 indicates that the Ticker Interface 14 periodically communicates with the Server Interface 13 to determine if new messages have been obtained by the Server Interface 13 from the shared folder 10. If new messages are discovered by the Ticker Interface 14, they are displayed on the user computer 101.

The bi-directional arrow between the Server Interface 13 and the Ticker Interface 14 indicates that each interface periodically checks the user computer 101 to ensure that the other interface is running. Thus, if the Ticker Interface 14 is not running, the Server Interface 13 will determine that the Ticker Interface 14 is not running and the Server Interface 13 will restart the Ticker Interface 14. Similarly, if the Server Interface 13 is not running, the Ticker Interface 14 will determine that the Server Interface 13 is not running and the Ticker Interface 14 will restart the Server Interface 13. Hindering users from shutting down the SMA Ticker 12 in this way may be advantageous in a BPO environment since users may attempt to shut down the Server Interface 13 and/or the Ticker Interface 14 services either by accident or intentionally. Users may intentionally attempt to shut down the Server Interface 13 and/or Ticker Interface 14 services because it may appear that these services are not directly related to the tasks assigned to the users. The periodic checking of the Server Interface and Ticker Interface services, as well as the restarting of a service interface (i.e. the Server Interface or the Ticker Interface) that is not running, may hinder users from preventing the dissemination of messages and thus may help ensure that each user receives the messages intended for that user. The result of consistent and reliable message dissemination may be that new information is distributed more quickly and efficiently and that the organization is able to respond more rapidly and flexibly to unanticipated events. Furthermore, users may be able to interact with their computers more efficiently, e.g. by using information provided in messages to avoid potential problems or by processing important information more rapidly than they would otherwise.

The admin computer 102 comprises the SMA Console 11. The admin computer 102 is a computer from which the shared folder 10 may accessed. Similar to the Server Interface 13 and the Ticker Interface 14, the SMA Console 11 may be run as a service on the admin computer 102. The admin computer may also function as a user computer. In other words, the SMA Ticker 12 may be run on the admin computer. This may be understood to mean that the Server Interface 13 and the Ticker Interface 14 may be executed separately on the admin computer 102 (not shown). The SMA Console executable, which may be executed in order to run the SMA Console 11 on the Admin Computer 102, may be stored in the shared folder 10 on the Server 100.

The SMA Console 11 may be used to administer the SMA Ticker 12. In particular, the SMA Console 11 may be used to configure the appearance of SMA Ticker window 20 on display 200, as indicated in FIG. 2. In addition, the SMA Console 11 may provide an interface to send messages via the SMA Ticker 12. The SMA Console 11 may also provide an interface to control access to the SMA Ticker 12 and the SMA Console 11.

The uni-directional arrow from the SMA Console 11 to the Shared Folder 10 indicates that the admin computer 102 can be used to access the one or more files that may be executed in order to run the SMA Console 11. The SMA Console 11 may also be used to modify settings stored on the shared folder 10 which will affect the behavior of the SMA Ticker 12.

FIG. 2 shows an example of an SMA Ticker window 20 with a message on a display 200. In the SMA Ticker window 20, the message displayed is: "Check the new update on your email". The size and/or the location of the SMA Ticker window 20 may enable the message to capture the attention of the user while covering a minimal portion of the user's workspace.

Figure 3:
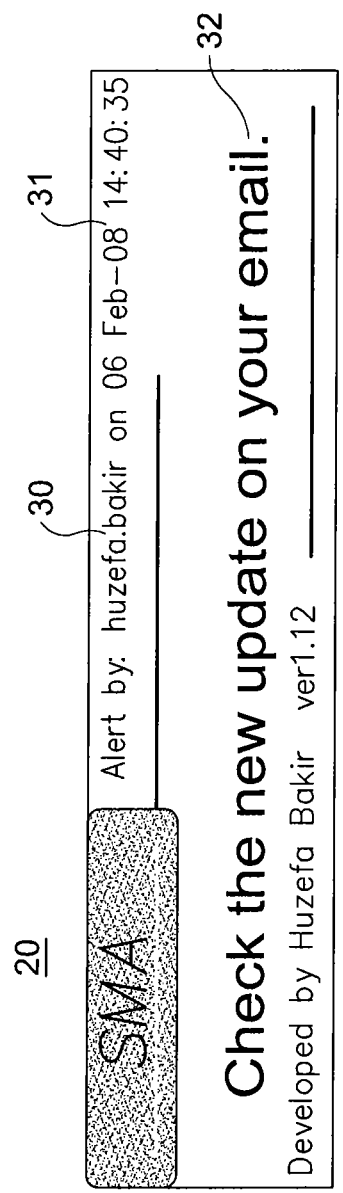
FIG. 3 shows an exemplary SMA Ticker window.

FIG. 3 shows an example of an SMA Ticker window 20 which may be executed on the user computer 101. The SMA Ticker window 20 shows a message 32, the login name 30 of the user who sent the message 32, and the date and time 31 the message 32 was sent.

Figure 4:
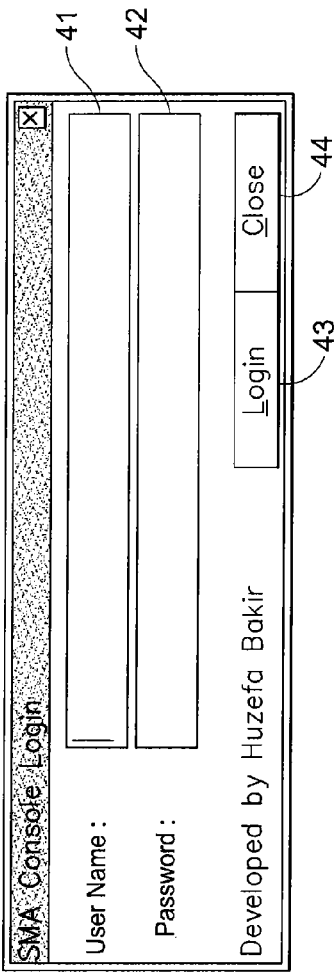
FIG. 4 shows an SMA Console Login screen.

FIG. 4 shows an example of an SMA Console Login screen or Graphical User Interface (GUI) 400. The SMA Console Login screen 400 may provide user authentication and/or control access to the SMA Console 11. This screen may be displayed after the SMA Console executable file is executed from the shared folder 10. The SMA Console 11 may be executed from the admin computer 102 or from the user computer 101 (not shown). A default user name and a default password may be entered in a User Name field 41 and a Password field 42 respectively, in order to login to the SMA Console 11. Once the User Name field 41 and the Password field 42 have been filled, the user may click on a Login button 43. If the correct user name and password were entered, the user ID of the logged in user is checked to ensure the user has access rights to the SMA Console 11. For example, in a Microsoft Windows environment, the login name the user uses in order to access the operating system may also be used to verify that the user has the right to access the SMA Console 11. An SMA Console Close button 44 may be clicked on in order to exit the SMA Console Login screen 400.

Figure 5:
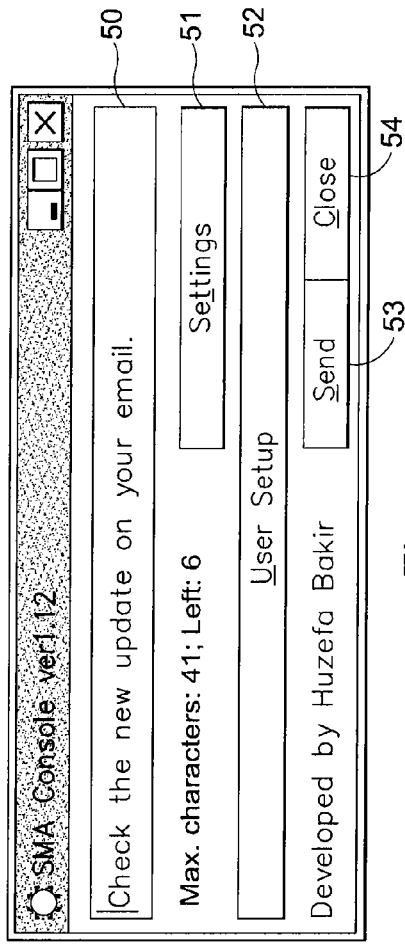
FIG. 5 shows an exemplary main screen of the SMA Console.

FIG. 5 shows an exemplary main screen or GUI 500 of the SMA Console 11. The main screen 500 may be used to send out messages to users running the SMA Ticker 12. The main screen 500 may be accessed through the SMA Console Login screen 400. The SMA Console Login screen 400 may be used to control which users are able to access the main screen 500.

Messages may be typed in message field 50. Once a message has been entered to a user's satisfaction, the message may be sent to all users running the SMA Ticker 12 by clicking on a Send button 53. The SMA Console main screen 500 may be exited by clicking on an SMA Console Close button 54.

User access rights to the SMA Ticker 12 and/or the SMA Console 11 may also be set up through the main screen 500 of the SMA Console 11. User access rights may be configured to allow three levels of access. Level 0 access may be understood to mean that a user is not allowed to run the SMA Console 11 or the SMA Ticker 12. Level 1 allows to run the SMA Ticker 12. Level 2 access allows to access the main screen 500 of the SMA Console 11.

The ability to control which users can send and receive messages may be advantageous in a BPO environment. Controlling which users can send messages may help ensure that only messages with appropriate content are distributed and that users are able to work with minimal interruptions. Controlling which users can receive messages may ensure that only users who are responsible for a specific set of tasks receive messages related to the set of tasks.

FIG. 6 shows an example of an SMA Settings screen or GUI 600. The SMA Settings screen 600 may be used to control the appearance, in particular how well objects on display 200 underneath the SMA Ticker window 20 can be seen, and the position of the SMA Ticker window 20 on display 200. The SMA settings screen 600 can also be used to control the length of time the SMA Ticker window 20 appears on a user display 200. The precise control over the SMA Ticker window 20 provided by the SMA Settings GUI 600 allows a user of the SMA Console 11 to tailor the appearance of messages to specific needs. By varying the appearance, position and/or the length of time the SMA Ticker window 20 is displayed, a user of the SMA Console 11 may be able to improve the likelihood that users will notice and/or understand messages.

The SMA Settings screen 600 may be accessed through the main screen 500 of the SMA Console 11 by clicking on a Settings button 51, as shown in FIG. 5. The settings selected in the SMA Settings screen 600 may be used to control the configuration of the SMA Ticker 12 on the user computer 101. For example, the SMA Settings screen may be used to control the way in which the SMA Ticker 12 is displayed on the user computer 101.

An SMA Position field 60 may include a pulldown menu that may be used to set the position of the SMA Ticker window 20 in the display 200. The pulldown menu may allow three possible selections including bottom right, center, and top right. For example, the selection of bottom right in the SMA Position field 60 would place the SMA Ticker in the bottom right of the display 200. An SMA PIX Position field 61 may be used to fine tune the position of the SMA Ticker window 20 in the display 200 with respect to the value selected in the SMA Position field 60.

A Popup field 62 includes a pulldown menu that may be used to control when the SMA Ticker window 20 pops up. If the Popup field 62 is set to "Continuous", there is no set time limit controlling the length of time the SMA Ticker window 20 will repeatedly pop up or be displayed in the display 200. In other words, if the Popup field 62 is set to "Continuous", the SMA Ticker window 20 will continue to pop up until the SMA Ticker window 20 is stopped (e.g. two ways to stop the SMA Ticker window 20 would be for the user to log out or for the user computer 101 to be shut down). If the Popup field 62 is set to "On Alert Change", then the SMA Ticker window 20 will only pop up in the display 200 after the message to be displayed has been changed. The Popup for field 63 is enabled if the Popup field 62 is set to "On Alert Change". The Popup for field 63 controls the number of minutes that the SMA Ticker will pop up on the user computer 101 after the message to be displayed has been changed. A Popup Timer field 64 may be used to set the interval in seconds between each popup of the SMA Ticker window 20.

A Transparency field 65 may be used to set the level of transparency of the SMA Ticker window 20. The level of transparency is a measurement of how well objects on display 200, underneath the SMA Ticker window 20, can be seen by a user. In one example, the level of transparency may be set to 0, in which case the SMA Ticker window 20 will appear opaque (i.e. objects underneath the SMA Ticker window cannot be seen). Alternatively the level of transparency may be set to 10 (i.e. a user can see through the SMA Ticker window), in which case the SMA Ticker window 20 will appear transparent. The level of transparency may also be set to some value between 0 and 10, in order to achieve an SMA Ticker appearance that is correspondingly between opaque and transparent. Thus, it is possible to configure the SMA Ticker so that a user may still view a window even if the SMA Ticker window 20 pops up over it.

An SMA Settings Save button 66 may be used to save the settings entered in the SMA Settings screen 600 and subsequently close the SMA Settings screen 600. A Cancel button 67 can be used to close the SMA Settings screen without saving any settings.

Figure 7:
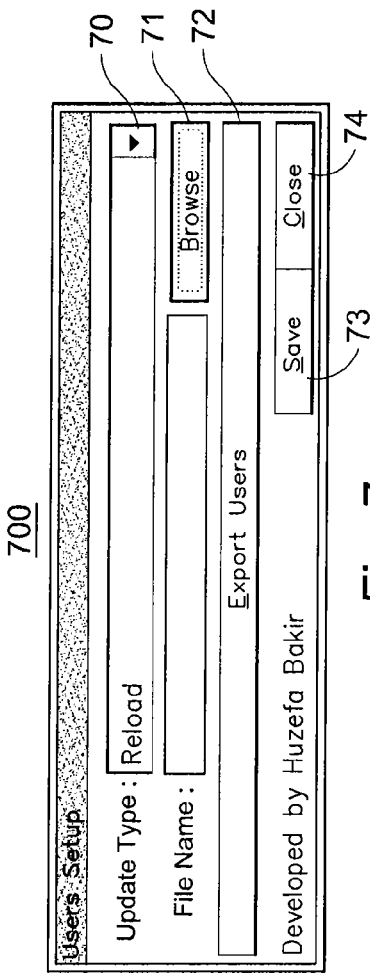
FIG. 7 shows an exemplary Users Setup screen, accessed via the SMA Console.

FIG. 7 shows an example of a Users Setup screen 700. The Users Setup screen 700 may be used to create, reload and/or update a user database. An Update Type field 70 includes a pulldown menu from which at least the values Reload and Append may be selected. If the Reload value is selected in the Update Type field 70, A Users Setup Save button 73 may be used to erase the user database and load new user data into the user database. If the Append value is selected in the Update Type field 70, the Users Setup Save button 73 may be used to append new entries to the existing user database. The user database may be encrypted.

The user database may define the access rights of users to the SMA Ticker 12 and the SMA Console 11. In particular, the user database may define whether a user has level 0 (no access), level 1 (able to receive messages) or level 2 (able to send and receive messages as well as configure and administer the SMA Ticker 12) access. A users file may be used to initialize, reload or update the user database. The users file may contain the information allowing to define user access rights to the SMA Console 11 and the SMA Ticker 12. A Browse button 71 allows a user to select the users file (e.g. Users.csv). The users file may contain a user name field and a login name field. Once the users file and a value for the Update Type field 70 have been selected, the Users Setup Save button 73 may be used to reload or update the user database. Once information in the users file is uploaded to the user database, the user name field may define the level of access to the SMA Console 11 and/or the SMA Ticker 12; the login name field may be used to identify the sender of a message and may also be used to authenticate users. For example, in a Microsoft Windows environment, the login name in the user database may be matched with the Microsoft Windows login of a user to establish a user's identity and/or access rights. An Export Users button 72 may be used to export the user names and login names in the user database to the users file. The Export Users button 72 may be used to create the users file in the shared folder 10.

As an example, the users file may be formatted in rows of comma separated values. Each row in the users file may have two columns, wherein the first column contains a user name and the second column contains a login name. If there is no row for a user in the users file, the user has no access (i.e. level 0 access) to the SMA Console or the SMA Ticker. A user with a row entry in the users file will have level 1 access (or user access) and is allowed to run the SMA Ticker. Users with level 2 access may be specifically identified in the users file. For example, a user with a specific character (e.g. a '#' sign) in front of the user name value in a row entry with the user's login name will have level 2 access. Level 2 access (or SMA Administrator access) will allow a user to run the SMA Ticker and the SMA Console. The users file may be created using Microsoft Excel, another spreadsheet program, a text editor or a similar software program. User access rights to the SMA Ticker do not take effect until the user names and corresponding login names have been saved to the user database.

A Users Setup Close button 74 may be used to close the Users Setup screen 700.

Figure 8:
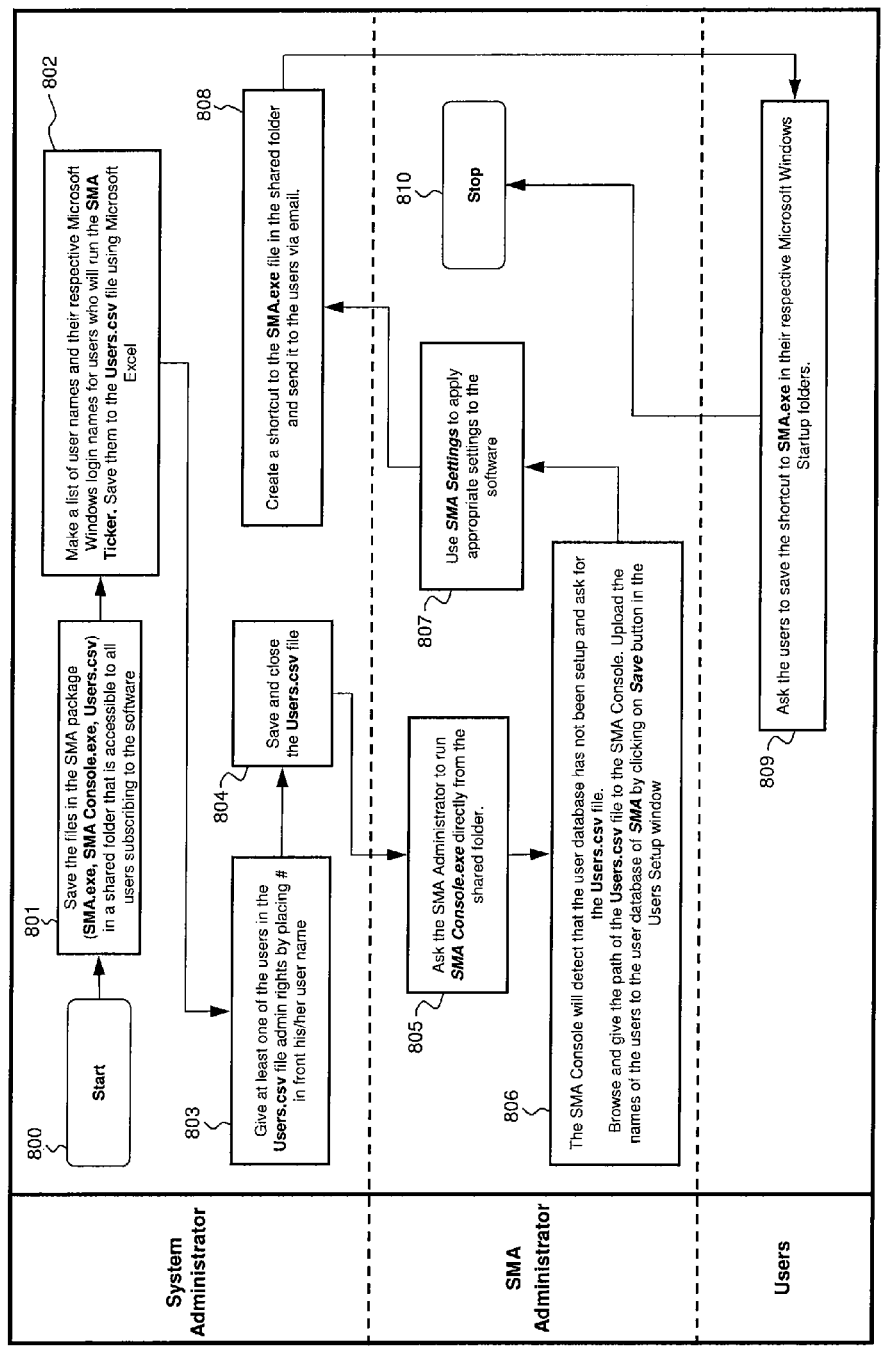
FIG. 8 is a flow diagram showing an example of how the SMA Package may be deployed.
Figure 9:
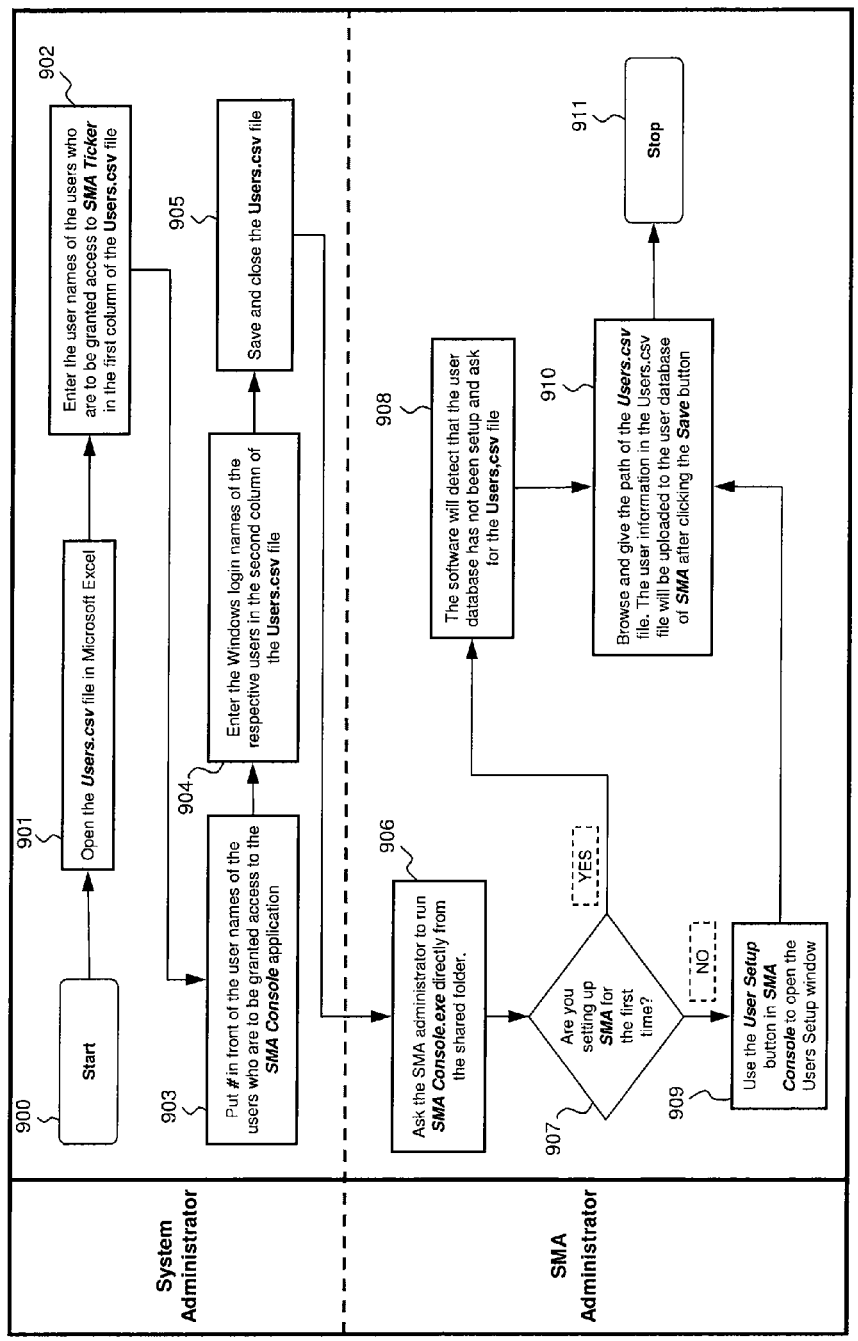
FIG. 9 is a flow diagram showing an example of how to set up the SMA user database.
Figure 10:
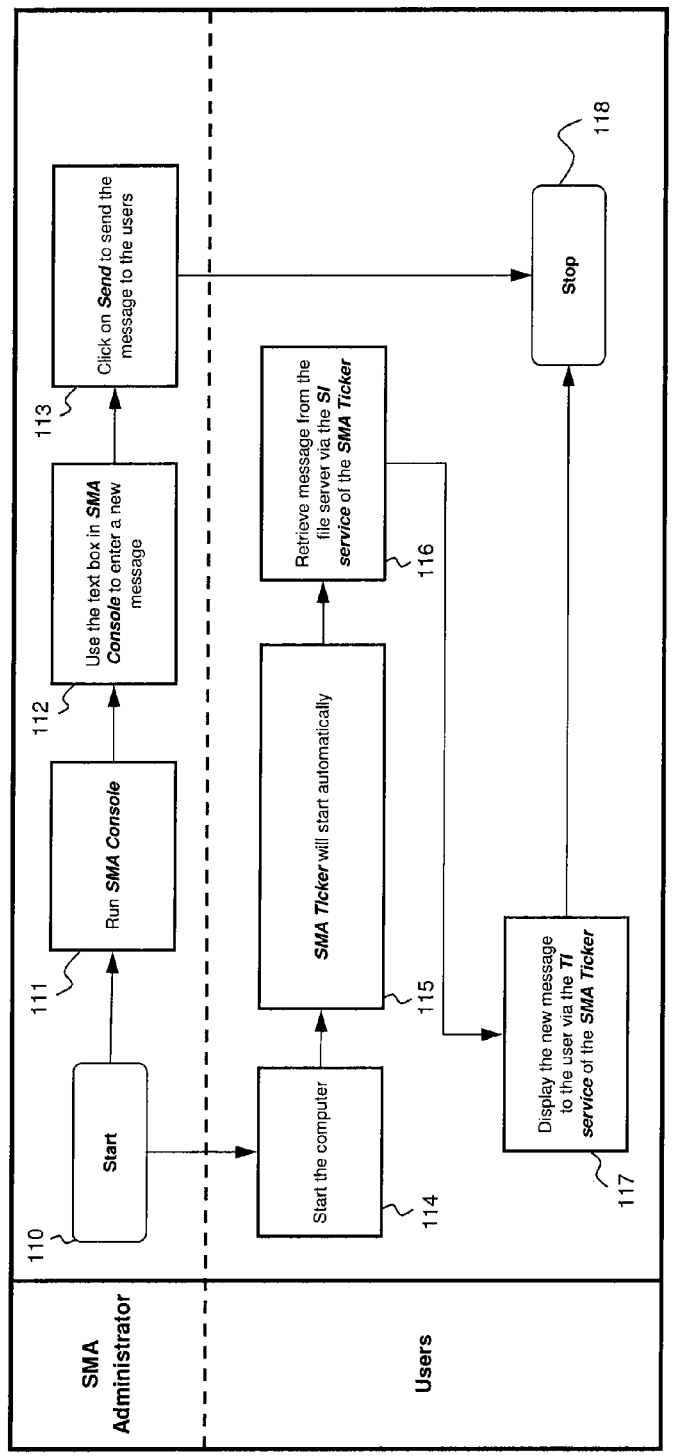
FIG. 10 is a flow diagram showing an example of how messages can be sent and displayed.

FIGS. 8, 9 and 10 depict flow charts illustrating tasks or steps associated with the SMA Package. In some cases, one or more tasks may be skipped or modified. In other cases, one or more new tasks may be added. The tasks are set out in rows to show the user or users responsible for carrying them out. Thus, the work of deploying the SMA Package may be distributed among multiple users and the burden on each user may be minimized. Because of the way the SMA Package is designed, the tasks described below are easy to perform and require little technical knowledge to carry out. For this reason, users are able to perform multiple and/or interchangeable roles. For example, a system administrator might also be one of the Users, and/or one of the Users might also be an SMA Administrator. There may be other possible combinations of tasks and responsible parties.

Generally, the SMA Package is deployed, the user database is set up and then messages may be sent. There may be some overlap between each of these sets of tasks (i.e. some tasks may be part of more than one set of tasks).

FIG. 8 shows a series of tasks that may be performed in order to deploy the SMA Package in a BPO environment.

After start (800), the files contained in the SMA Package (SMA.exe, SMA Console.exe and Users.csv) are stored in a shared folder 10 (801) that is accessible to the users who are to be granted access to the software, e.g. the user of the user computer 101. In this example, SMA.exe can be used to run the SMA Ticker 12, including the Server Interface 13 and the Ticker Interface 14. The SMA Console.exe can be used to run the SMA Console 11, including the SMA Console login screen 400, the main screen 500, the SMA Settings screen 600 and the Users Setup screen 700. The Users.csv file is a users file that may be used to store user names and passwords of users authorized to use the SMA Ticker 12 and the SMA Console 11.

Input is obtained to create a list of user names and their respective Microsoft Windows login names (802) for users who may run the SMA Ticker 12. The list may be created using Microsoft Excel and saved in comma separated values (CSV) format, with a .csv extension. In each row, the user name is the first value, and the Microsoft Windows login name is the second value.

At least one of the users in the Users.csv file is identified as an SMA Administrator (803). This may be achieved by the placement of a specific character (e.g. a '#' sign) in front of the value in the user name field of the Users.csv file corresponding to the user's name. Thus, this user will be able to run both the SMA Console 11 and the SMA Ticker 12. The Users.csv file can then be saved and closed in step 804.

The SMA Console.exe file (805) residing in the shared folder 10 may be remotely executed from the admin computer 102. The SMA Console.exe file may also be executed from the user computer 101. The SMA Console 11 detects (806) that the user database has not been set up and prompts for the Users.csv file by displaying the Users Setup screen 700. The path to the Users.csv file created in step 804 may then be provided. The information in the Users.csv file may be saved to the user database by clicking the Users Setup Save button 73 in the Users Setup screen 700. Once the information in the Users.csv file has been saved to the user database, the users in the Users.csv file will obtain corresponding access rights to the SMA Ticker.

The appropriate settings for the SMA Console and/or the SMA Ticker 12 may be applied (807), for example by using the SMA Settings screen 600.

A shortcut to the SMA.exe file in the shared folder 10 may be created and sent to the users listed in the Users.csv file via email (808). Upon receipt of this file, the users can save the shortcut in their respective Microsoft Windows Startup folders (809). The users may then execute SMA.exe, using the shortcut, in order to start the SMA Ticker 12 on their computers. In addition or alternatively, the user computers (e.g. the user computer 101) may be restarted in order to ensure that the SMA Ticker 12 will start up when the users log in to their computers.

As an alternative to steps 808 and 809, SMA.exe may be included as part of a login script so that it runs automatically when a user logs in to a user computer (e.g. the user computer 101).

Finally, the SMA Package has been deployed and messages may be sent to users (810).

The steps above demonstrate the ease with which the SMA Package may be deployed. It may be possible to deploy the SMA Ticker on the user computer 101 by ensuring that the SMA Ticker will be executed when the user of the user computer 101 starts up and logs into the user computer 101. It may be the case that users need only copy a shortcut to the Microsoft Windows Startup folder on their computers. If the SMA Ticker 12 is activated via a user login script, it is unnecessary for the user to do anything at all in order to install the SMA Ticker 12. User login scripts may be modified by automated means, further minimizing the work that must be performed in order to install the SMA Package. It is unnecessary for installation to be performed on each user computer (e.g. the user computer 101), since no files need to be stored on the or a specific user computer and no registry changes need to be made on the user computer in order for installation to be completed. Thus, system administrators do not need to physically visit every user computer, nor is it necessary to use remote system administration software. Configuring the user database also is without technically difficult steps; a simple spreadsheet (e.g. Users.csv) may be created and a graphical user interface (e.g. Users Setup screen 700) is provided to assist a user or system administrator in using the spreadsheet to configure the user database.

FIG. 9 shows a series of tasks that may be performed in order to setup or update a user database.

After start (900), the Users.csv file may be opened in Microsoft Excel (901). User names of the users who are to be granted access to the SMA Ticker 12 may then be entered in the first column of the Users.csv file (902). Users who are to be granted level 2 access to the SMA Console may be identified. As an example, a user who is to be granted level 2 access to the SMA Console may be identified by placing a specific character (e.g. a '#' sign) in front of her user name (903). In column 2 of the Users.csv file, the Windows login names that correspond to the user names entered in column 1 may be entered (904). The Users.csv file may be subsequently saved and closed (905).

The SMA Console.exe file, stored in the shared folder 10 may be remotely executed from the admin Computer 102 (906). If the SMA Package is being set up for the first time (907), or, put another way, if the user database has not yet been created, the SMA software will detect this and prompt for the path to the Users.csv file (908). If the the SMA Package is not being set up for the first time, i.e. the user database already exists, the User Setup button 52 in the main screen of the SMA Console 500 may be used to open the Users Setup window (909). The path to the Users.csv file may be subsequently provided. The user information contained in the Users.csv file will be uploaded to the user database after the administrator clicks the Users Setup Save button 73 in the Users Setup window (910) after which the process is stopped (911).

FIG. 10 shows a series of tasks which may be performed in order to send a message to one or more users after starting (110).

The administrator executes the SMA Console application from the admin computer 102 (111). Using the text box 50 in the SMA Console main screen 500, the administrator enters a message (112). The administrator may examine the message to ensure it is satisfactory and then click on the send button to send it to users of the SMA Ticker 12 (113).

When a user starts his computer (114) and logs in (e.g. via a Microsoft Windows user login and password) the SMA Ticker 12 will start automatically (115). The automatic startup of the SMA Ticker 12 may be achieved via a shortcut in the Windows Startup folder, via a login script or via some other mechanism. After an administrator send a message (113), the Server Interface (SI) 13 service of the SMA. Ticker 12 retrieves the message from the file server (116). Once the message has been retrieved by the Server Interface, the Ticker Interface (TI) 14 service of the SMA Ticker 12 displays the message to the user (117).

The SMA Ticker window 20 may be removed from the user display 200 by sending out a blank alert via the SMA Console 11.

Then, the process stops (118).

Figure 11:
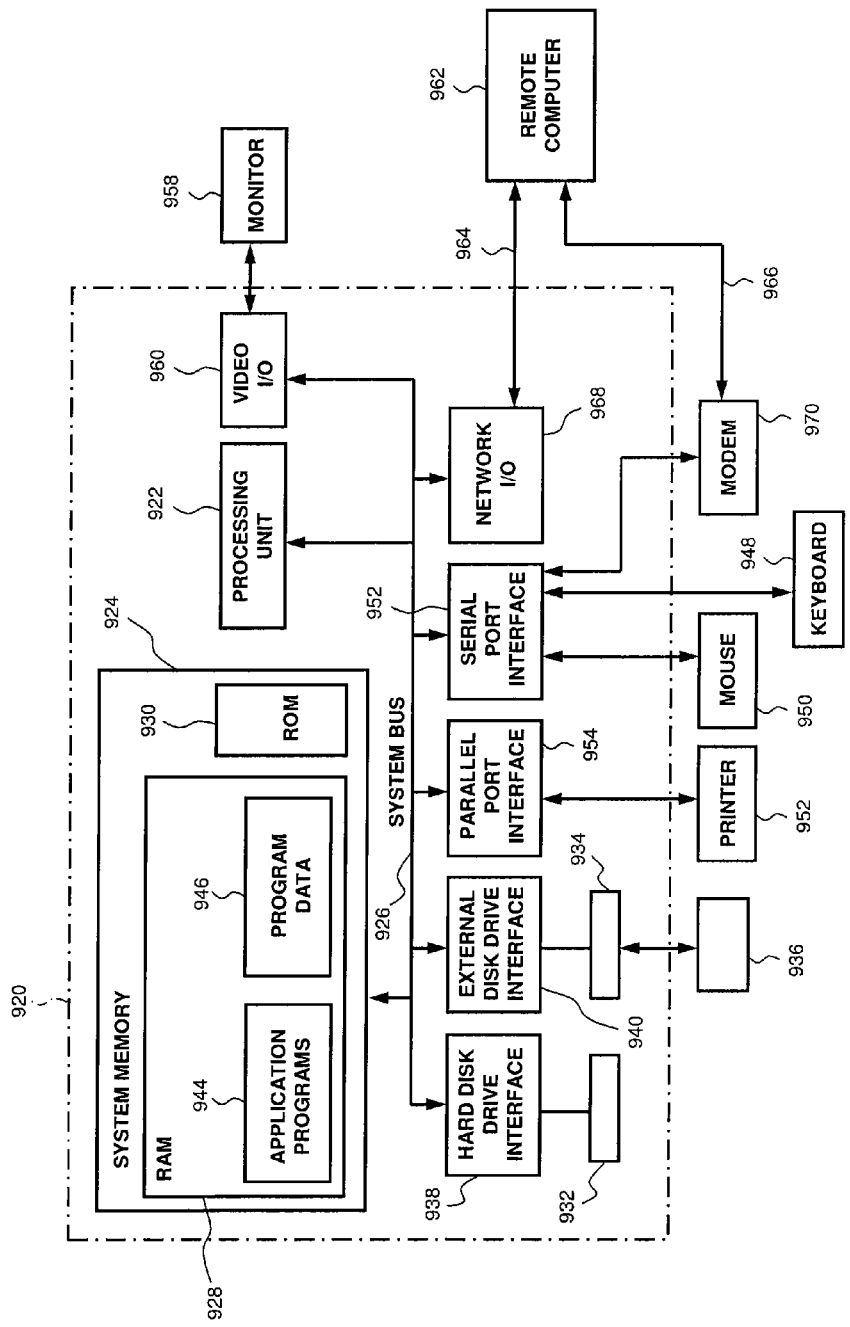
FIG. 11 shows a block diagram of an exemplary computer system.

FIG. 11 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for processing messages in a BPO environment, as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 10.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 11 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 11 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the Short Message Alert (SMA) (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for processing messages in a BPO environment.

The invention claimed is:

1. A method for processing messages in a Business Process Outsourcing (BPO) environment, the method comprising:
   obtaining messages from a shared folder using a network interface;
   displaying the messages using a display interface;
   providing access control, including, controlling access to the messages and dissemination of the messages;
   storing the shared folder on a server computer in the BPO environment, the shared folder containing the computer program and accessible by a user computer in the BPO environment, and wherein the BPO environment comprises one or more computers connected by a network and imposes one or more technical restrictions on a user, the user computer, the server computer, or any combination thereof; and
   executing the computer program in the shared folder by the user computer in order to separately run the display interface and the network interface from the user computer.

2. The method of claim 1, further comprising accepting, by the user computer, network communications received as a response to a request originating from the user computer and refusing to accept, by the user computer, network communications which originate from another computer.

3. The method of-claim 1, wherein installing and executing the computer program does not require administrator access.

4. The method of claim 1, wherein installing the computer program does not require changes to a registry of the user computer.

5. The method of claim 1, wherein:
   the network interface and the display interface are executed as separate processes or threads on the user computer.

6. The method claim 1, wherein, in the BPO environment:
   the user computer does not have access to the Internet.

7. The method of claim 1, wherein providing access control further includes controlling which users are able to receive or send the messages.

8. The method of claim 1, wherein installing and executing the computer program does not require opening TCP/IP ports.

9. The method of claim 1, wherein users are hindered from preventing the dissemination of the messages.

10. The method of claim 1, wherein the method is performed without installing any files on the user computer.

11. A computer program product comprising non-transitory computer-readable instructions, which, when loaded and executed on a computer system, cause the computer system to perform operations according to the method of claim 1.

12. A system for generating and disseminating messages in a Business Processing Outsourcing (BPO) environment, the system comprising:
   means for installing and executing a computer program;
   a network interface for obtaining messages from a shared folder;
   a display interface for displaying the messages;
   means for providing access control, including, controlling access to the messages, and dissemination of the messages;
   at least one user computer in the BPO environment configured to separately execute the network interface and the display interface;

a server computer in the BPO environment that stores the shared folder, the shared folder storing the computer program and accessible by the user computer; and wherein the user computer is configured to execute the computer program in the shared folder in order to execute the display interface and the network interface on the user computer; and wherein the BPO environment comprises one or more computers connected by a network and imposes one or more technical restrictions on a user, the user computer, the server computer, or any combination thereof.

13. The system of claim 12, wherein the user computer is configured to accept network communications received as a response to a request originating from the user computer and the user computer is further configured to not accept network communications which originate from another computer.

14. The system of claim 12, wherein the means for installing and executing the computer program does not require administrator access.

15. The system of claim 12, wherein the means for installing the computer program does not require changes to the registry of the user computer.

16. The system of claim 12, wherein:
the network interface and the display interface comprise separate processes or threads on the user computer.

17. The system of claim 12, wherein, in the BPO environment:
the user computer does not have access to the Internet.

18. The system of claim 12, where the means for providing access control is also for controlling which users are able to receive or send messages.

19. The system of claim 12, where the means for installing and executing the computer program does not require opening TCP/IP ports.

20. The system of claim 12, where the user computer is configured to hinder the prevention of display of the messages.

21. The system of claim 12, where the user computer is configured to execute the computer program from the shared folder without installing the computer program on the user computer.

* * * * *

UNITED STATES PATENT AND TRADEMARK OFFICE
CERTIFICATE OF CORRECTION

PATENT NO.      : 8,554,834 B2
APPLICATION NO. : 13/128622
DATED           : October 8, 2013
INVENTOR(S)     : Yusuf Huzefa Bakir It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this
Fifteenth Day of September, 2015

Michelle K. Lee
*Director of the United States Patent and Trademark Office*